(12) United States Patent
Hackborn et al.

(10) Patent No.: US 8,984,008 B2
(45) Date of Patent: Mar. 17, 2015

(54) RE-USE OF BINARIES FOR MULTIPLE USER ACCOUNTS

(71) Applicant: Google Inc., Mountain View, CA (US)

(72) Inventors: Dianne Kyra Hackborn, Menlo Park, CA (US); Andrew Devron Stadler, San Francisco, CA (US); Amith Yamasani, San Jose, CA (US); Kenneth Root, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/940,068

(22) Filed: Jul. 11, 2013

(65) Prior Publication Data

US 2014/0114957 A1    Apr. 24, 2014

Related U.S. Application Data

(60) Provisional application No. 61/716,309, filed on Oct. 19, 2012, provisional application No. 61/791,668, filed on Mar. 15, 2013.

(51) Int. Cl.
  *G06F 17/30*    (2006.01)

(52) U.S. Cl.
  CPC ................................ *G06F 17/30386* (2013.01)
  USPC ........... 707/781; 707/640; 707/661; 707/694; 707/704; 707/736

(58) Field of Classification Search
  USPC .......... 707/640, 661, 687, 694, 704, 736, 781
  See application file for complete search history.

(56) References Cited

U.S. PATENT DOCUMENTS

| | | | |
|---|---|---|---|
| 7,716,743 B2 * | 5/2010 | Costea et al. | 726/25 |
| 7,761,870 B2 * | 7/2010 | Westendorf et al. | 717/175 |
| 7,917,487 B2 * | 3/2011 | Hughes et al. | 707/706 |
| 7,979,893 B2 * | 7/2011 | Ontaneda et al. | 726/2 |
| 8,099,332 B2 | 1/2012 | Lemay et al. | |
| 8,489,596 B1 * | 7/2013 | Milton et al. | 707/735 |
| 2002/0083209 A1 | 6/2002 | Ahrens et al. | |
| 2004/0172612 A1 * | 9/2004 | Kasravi et al. | 717/101 |
| 2005/0144528 A1 | 6/2005 | Bucher et al. | |
| 2005/0229174 A1 * | 10/2005 | Westendorf et al. | 717/175 |
| 2006/0130053 A1 * | 6/2006 | Buljore et al. | 717/173 |
| 2006/0161988 A1 * | 7/2006 | Costea et al. | 726/25 |
| 2007/0204016 A1 * | 8/2007 | Kunz et al. | 709/223 |
| 2008/0168437 A1 | 7/2008 | Chen et al. | |
| 2008/0301667 A1 * | 12/2008 | Rao et al. | 717/172 |
| 2008/0301672 A1 * | 12/2008 | Rao et al. | 717/177 |

(Continued)

OTHER PUBLICATIONS

International Search Report and Written Opinion of International application No. PCT/US2013/065700, mailed May 30, 2014, 12 pp.

*Primary Examiner* — Sana Al Hashemi
(74) *Attorney, Agent, or Firm* — Shumaker & Sieffert, P.A.

(57) ABSTRACT

A computing device has multiple user profiles. While a particular user profile is the currently-active user profile of a computing device, the computing device determines whether a binary that is not associated with the particular user profile is already stored at the computing device. In response to determining that the binary is not already stored at the computing device, the computing device downloads the binary from a computing system other than the computing device and associates the binary with the particular user profile. If the binary is already stored at the computing device, the computing device associates the binary with the particular user profile without downloading the binary again.

20 Claims, 7 Drawing Sheets

(56) References Cited

U.S. PATENT DOCUMENTS

| | | | |
|---|---|---|---|
| 2008/0301803 A1* | 12/2008 | Ontaneda et al. | 726/17 |
| 2008/0313313 A1 | 12/2008 | Doshi et al. | |
| 2009/0248737 A1* | 10/2009 | Shukla et al. | 707/103 R |
| 2009/0307105 A1* | 12/2009 | Lemay et al. | 705/26 |
| 2010/0211884 A1* | 8/2010 | Kashyap et al. | 715/745 |
| 2011/0099616 A1* | 4/2011 | Mazur et al. | 726/7 |
| 2012/0032945 A1* | 2/2012 | Dare et al. | 345/418 |
| 2012/0131482 A1 | 5/2012 | Dawson et al. | |
| 2013/0019234 A1* | 1/2013 | Pardehpoosh et al. | 717/170 |
| 2013/0019237 A1* | 1/2013 | Pardehpoosh et al. | 717/171 |

* cited by examiner

RE-USE OF BINARIES FOR MULTIPLE USER ACCOUNTS

This patent application claims the benefit of U.S. Provisional Patent Application No. 61/716,309, filed Oct. 19, 2012, and U.S. Provisional Patent Application No. 61/791,668, filed Mar. 15, 2013, the entire contents of which are incorporated herein by reference.

BACKGROUND

Mobile computing devices, such as mobile phones and tablet computers, are becoming increasingly powerful and ubiquitous. Software applications for these mobile computing devices are widely available and offer extensive and increasing functionality. As a result, mobile computing devices are capable of processing a wide variety of potentially-sensitive or personal information (e.g., documents, e-mails, and pictures) for display (e.g., on a screen) or otherwise for output to a user.

Certain mobile computing devices can operate in a limited access state that prevents an unauthorized user from accessing applications and information stored by the computing device, thereby effectively "locking" the mobile computing device. For example, some mobile computing devices require users to provide specific inputs to lock and/or unlock the computing devices. While the locking techniques can provide security for information stored by the mobile computing device as well as protection from accidental inputs, once the mobile computing device is unlocked, the mobile computing device may provide access to the applications and information stored within the mobile computing device to any user who provides the specific input to unlock the mobile computing device.

SUMMARY

In one aspect, this disclosure describes a method that comprises determining, by a computing device, whether a binary data set is already stored at the computing device. The binary data set is not associated with a particular user profile of the computing device, the particular user profile being a currently-active user profile of the computing device. Furthermore, the method comprises, in response to determining that the binary data set is not already stored at the computing device, downloading, by the computing device, the binary data set from a computing system other than the computing device and associating, by the computing device, the binary data set with the particular user profile. The method also comprises in response to determining that the binary data set is already stored at the computing device, associating the binary data set with the first user profile without downloading the binary data set.

In another aspect, this disclosure describes a computing device that comprises one or more processors configured to determine whether a binary data set is already stored at the computing device. The binary data set is not associated with a first user profile of the computing device but is associated with a second user profile of the computing device. The one or more processors are also configured to download, in response to determining that the binary data set is not already stored at the computing device, the binary data set from a computing system other than the computing device and associate the binary data set with the first user profile. Furthermore, the one or more processors are configured to associate, in response to determining that the binary data set is already stored at the computing device, the binary data set with the first user profile without downloading the binary data set.

In another aspect, this disclosure describes a computer-readable storage medium that stores instructions that, when executed by one or more processors of a computing device, cause the computing device to determine, in response to receiving an indication of a user input, whether a binary data set is already stored at the computing device. The binary data set is not associated with a first user profile of the computing device but is associated with a second user profile of the computing device, the first user profile being a currently-active user profile of the computing device. Furthermore, the instructions cause the computing device to download, in response to determining that the binary data set is not already stored at the computing device, the binary data set from a computing system other than the computing device and associate the binary data set with the first user profile. The instructions also cause the computing device to associate, in response to determining that the binary data set is already stored at the computing device, the binary data set with the first user profile without downloading the binary data set.

One or more examples are set forth in the accompanying drawings and the description below. Other features, objects, and advantages will be apparent from the description, drawings, and claims.

DETAILED DESCRIPTION

In general, this disclosure describes techniques for enabling and supporting multiple user profiles on a mobile computing device. Conventionally, once a user unlocks a mobile computing device, the mobile computing device provides access to the applications and information stored at the mobile computing device to any user who provides the specific input to unlock the device. For example, if two different users share access to the same mobile computing device, each user is typically able to access any information or execute any application stored on the computing device or otherwise accessible to the computing device. For example, if a first user enters a username and password for an email account, a second user who uses the device is able to launch the email application and access the first user's email account and associated emails. As another example, the second user may access and delete information, applications, etc. installed and/or configured by the first user.

In accordance with techniques of this disclosure, a mobile computing device may be configured with multiple different user profiles, each user profile being separate from the other user profiles such that a user associated with a first user profile is prevented from gaining access to other users' profiles without providing proper authentication information for the other user profiles. Aspects of this disclosure are directed to resource management by sharing of resources between multiple users having different profiles. For example, if an application is downloaded and installed by a computing device while operating with a first user profile as the active user profile and the computing device receives a command to cause the computing device to download and install the same application while operating with a second, different, user profile as the active user profile, techniques of this disclosure may enable the computing device to bypass the download and installation of a second copy of the same application. Instead, the computing device may be configured to create a new set of configuration data and user data within the different user profile and enable both users to utilize a same executable binary for the application while nevertheless maintaining separate user-specific data.

Figure 1:
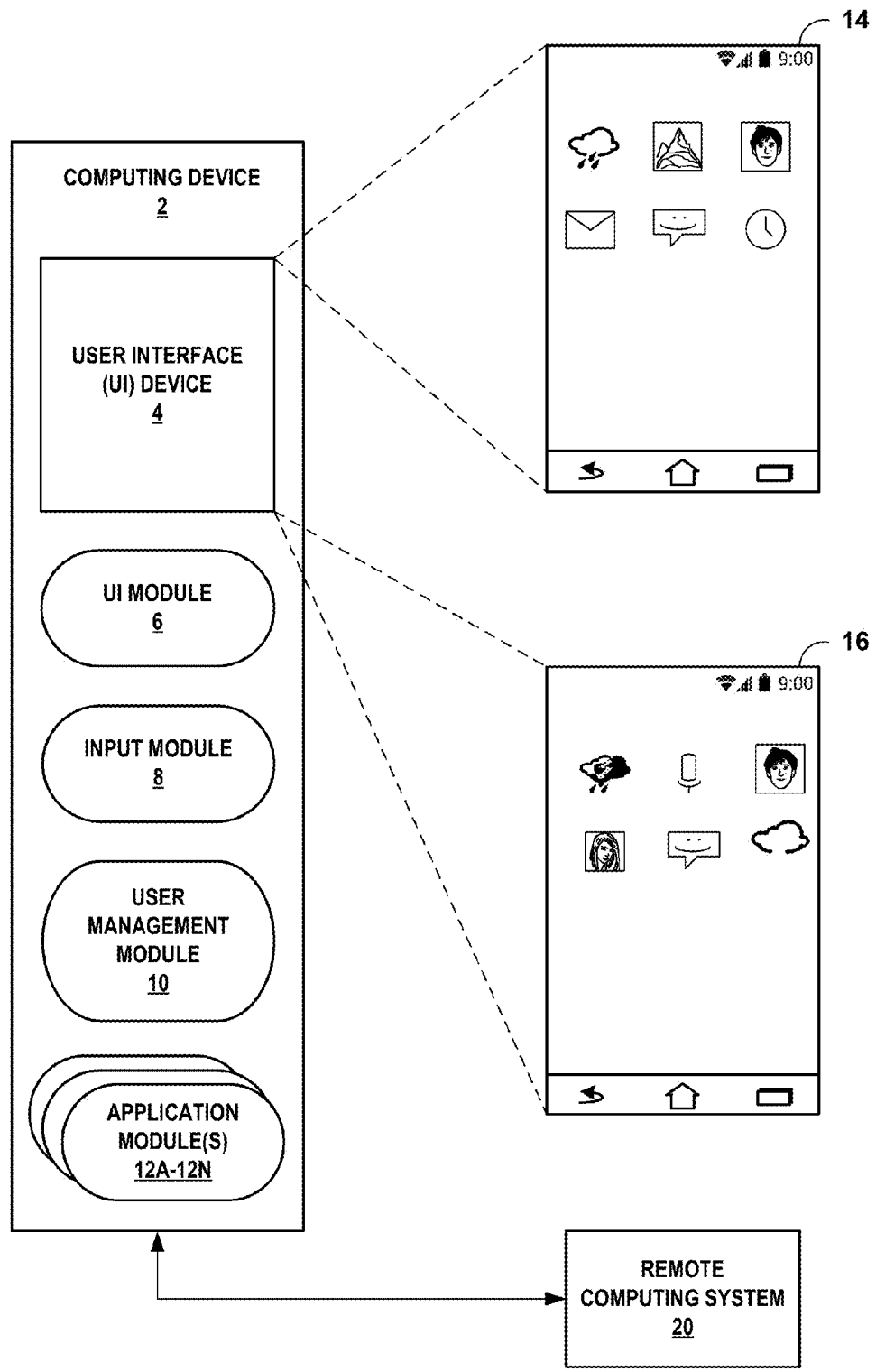
FIG. 1 is a conceptual diagram illustrating an example computing device in accordance with one or more aspects of the present disclosure.

FIG. 1 is a conceptual diagram illustrating an example computing device 2 in accordance with one or more techniques of this disclosure. Computing device 2 may be various types of computing devices. For example, computing device 2 may be a mobile device, such as a mobile telephone, a tablet computer, a notebook or laptop computer, a personal media player, a portable gaming device, or another type of computing device designed for mobility. In other examples, computing device 2 may be other types of computing devices, such as desktop computers, point of sale devices, televisions, gambling devices, appliances, in-car computers, and other types of computing devices. In other examples, computing device 2 may be one or more processors of a device.

In the example of FIG. 1, computing device 2 includes at least one user interface (UI) device 4. UI device 4 may display graphical data and may detect the presence of one or more input objects, such as fingers or styli. Because UI device 4 may display graphical data and may detect the presence of one or more input objects, UI device 4 may be referred to as a presence-sensitive display device. UI device 4 may be implemented using various technologies. For example, UI device 4 may be implemented using a resistive touchscreen, a surface acoustic wave touchscreen, a capacitive touchscreen, a projective capacitance touchscreen, an acoustic pulse recognition touchscreen, or another touchscreen technology. In some examples, UI device 4 may be able to detect the presence of an input object without the input object physically touching UI device 4.

UI device 4 may be operatively coupled to computing device 2 in various ways. For example, UI device 4 may be integrated into a housing of computing device 2 and may be connected to computing device 2 via one or more internal connectors. In another example, UI device 4 may be external to a housing of computing device 2 and may communicate with computing device 2 via one or more external cables and/or communication networks. Although the example of FIG. 1 assumes that UI device 4 is a presence-sensitive display device, the techniques of this disclosure are not so limited. In other examples, UI device 4 may be a display device that does not detect the presence of input objects. In such examples, computing device 2 may receive indications of user input from one or more input devices other than UI device 4.

As shown in FIG. 1, computing device 2 may include UI module 6. UI module 6 may perform one or more functions to receive input, such as indications of user input or network data, and send such input to other components associated with computing device 2, such as input module 8. For example, UI module 6 may determine, based on indications of user input, that a gesture was performed by a user at UI device 4. UI module 6 may also receive data from components associated with computing device 2, such as input module 8. Using the data, UI module 6 may cause other components associated with computing device 2, such as UI device 4, to provide output based on the data.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Computing device 2, in some examples, includes input module 8. Input module 8 may include functionality to perform any variety of operations on computing device 2. For instance, input module 8 may include functionality to determine gesture, keyboard, or other user inputs in accordance with the techniques described herein. Input module 8 may be implemented in various ways. For example, input module 8 may be implemented as a downloadable or pre-installed application or "app." In another example, input module 8 may be implemented as part of a hardware unit of computing device 2. In another example, input module 8 may be implemented as part of an operating system of computing device 2.

Input module 8 may receive data from components associated with computing device 2, such as UI module 6. For instance, input module 8 may receive gesture data from UI module 6 that causes input module 8 to determine one or more actions to perform from the gesture data. Input module 8 may also send data to components associated with computing device 2, such as UI module 6. For instance, input module 8 may send text determined from the gesture data to UI module 6 that causes UI device 4 to display GUIs 14 and 16.

As shown in FIG. 1, GUIs 14 and 16 may be user interfaces generated by UI module 6 that allows a user to interact with computing device 2. GUIs 14 and 16 may include graphical content. Graphical content, generally, may include text, images, a group of moving images, etc. Each of GUIs 14 and 16 may be associated with a different user profile of computing device 2.

User management module 10 may manage one or more user profiles configured at computing device 2. For example, user management module 10 may create, modify, or delete user profiles configured at computing device 2, e.g., responsive to user input received by input module 8. In some instances, user management module 10 may control access to information stored at computing device 2 and associated with various user profiles configured at computing device 2 by, for example, authenticating user input received by UI device 4 against stored authentication information associated with a particular user profile to determine whether to grant access to the user profile.

In some cases, multiple users may use computing device 2. Respective users may be associated with respective user profiles on computing device 2. For example, different members of a family may be associated with different user profiles on computing device 2. Each of the user profiles may be associated with a plurality of binaries. This disclosure may also refer to a binary as a "binary data set". In some examples, the binaries may include instructions that, when executed, configure computing device 2 to provide applications (i.e., "apps"). In other examples, the binaries may include media resources, such as recorded songs, recorded videos, electronic books, electronic magazines, and so on.

Computing device 2 may output, for display at UI device 4, different GUIs for different user profiles. For example, computing device 2 may output, for display at UI device 4, different launcher GUIs for different user profiles of computing device 2. The launcher GUI for a user profile may include graphical elements (e.g., icons) that correspond to applications associated with the user profile, but not applications that are not associated with the user profile. While UI device 4 displays the launcher GUI for the user profile, computing device 2 may initiate execution of (i.e., launch) an application associated with the user profile in response to receiving an indication of a user input that corresponds to a user selection of the graphical element that corresponds to the application. Because the launcher GUI for the user profile does not include graphical elements for applications that are not associated with the user profile, computing device 2 may not initiate execution of an application that is not associated with the user profile, even if the binary for the application is stored at computing device 2 and is associated with another user profile of computing device 2.

In the example of FIG. 1, GUI 14 is an example launcher GUI for a first user profile and GUI 16 is an example launcher GUI for a second user profile. Because the first and second user profiles may be associated with different applications, GUIs 14 and 16 may, as shown in the example of FIG. 1, include graphical elements that correspond to different applications.

In another example, computing device 2 may present different media resources for different user profiles. For example, each user profile of computing device 2 may be associated with a media library. The media library for a user profile may include media resources that are associated with the user profile and does not include media resources that are not associated with the user profile. Accordingly, computing device 2 may not present (e.g., playback, output for display, etc.) a media resource that is not associated with the user profile, even if the binary for the media resource is stored at computing device 2 and is associated with another user profile of computing device 2.

A user of computing device 2 may want to be able to use a binary while the currently-active user profile of computing device 2 is the user profile associated with the user. Accordingly, computing device 2 may receive an indication of a user input to install the binary on computing device 2. Conventionally, in response to the user input, computing device 2 would download the binary from a remote computing system 20 and associate the binary with the user profile of the user, even if the binary is already stored at computing device 2 and associated with another user profile of computing device 2. Thus, there may be two separate copies of the binary on computing device 2. This may be a waste of storage space. Furthermore, it may be a waste of transmission bandwidth to download the binary. In addition, if the user has to pay to download the binary and the user profiles of computing device 2 are associated with different members of the same family, different members of the family may unnecessarily pay for multiple copies of the binary.

To address these problems, computing device 2 may, in accordance with the techniques of this disclosure, determine whether the binary is already stored at computing device 2. In some examples, computing device 2 may determine whether the binary is already stored at computing device 2 by comparing a hash value of the binary with hash values of binaries stored at computing device 2.

In response to determining that the binary is not already stored at computing device 2, computing device 2 may download the binary, store the binary, and associate the binary with a currently-active user profile. In response to determining that the binary is already stored at computing device 2, computing device 2 may associate the binary with the currently-active user profile without downloading the binary again. In this way, computing device 2 may only download, store, and use a single copy of the binary. For instance, computing device 2 may execute a same copy of the binary to provide an application, regardless of which user profile of computing device 2 is the currently-active user profile. This may help to conserve storage resources of computing device 2 and may reduce the amount of data that computing device 2 sends and receives. Furthermore, this may, in some circumstances, help prevent different members of a family from paying for the same binary multiple times.

Hence, in accordance with the techniques of this disclosure, computing device 2 may determine that a binary data set is already stored at computing device 2, the binary data set not being associated with a particular user profile of the computing device, the particular user profile being a currently-active user profile of the computing device. In response to determining that the binary data set is not already stored at computing device 2, computing device 2 may download the binary data set from remote computing system 20. In addition, computing device 2 may associate the binary data set with the particular user profile.

Similarly, computing device 2 may receive an indication of user input to uninstall a resource, such as an application. In response to the indication of user input, computing device 2 may disassociate the application's binary from the currently active user profile. Furthermore, computing device 2 may determine whether the resource's binary is associated with any of the user profiles of computing device 2. In response to determining that the resource's binary is not associated with any of the user profiles of computing device 2, computing device 2 may delete the resource's binary. However, if the resource's binary remains associated with one or more user profiles, computing device 2 does not delete the resource's binary. In this way, if the resource's binary is still associated with one or more user profiles, the resource's binary may remain available for use on computing device 2.

Figure 2:
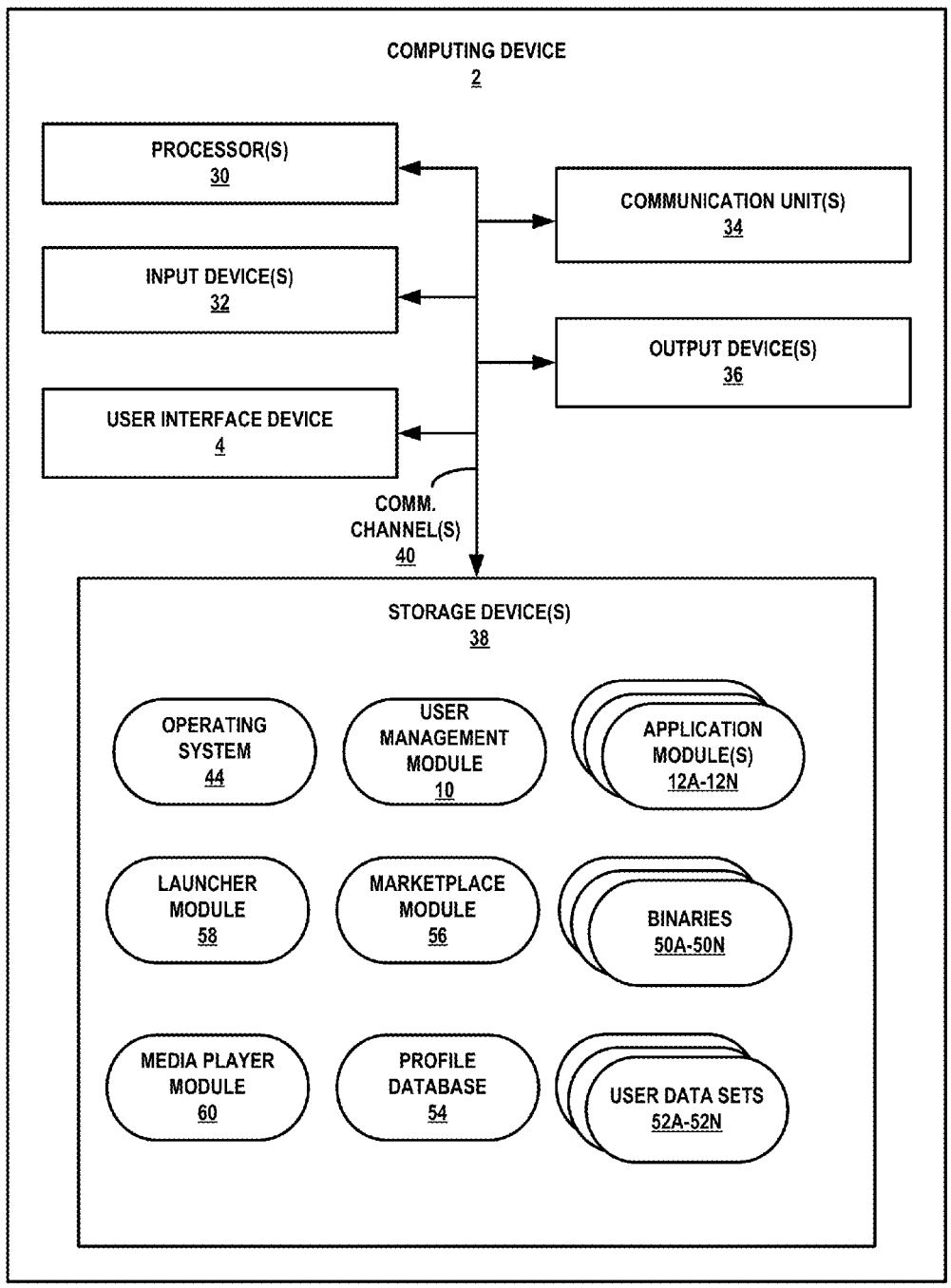
FIG. 2 is a block diagram illustrating example details of the computing device of FIG. 1, in accordance with one or more aspects of the present disclosure.

FIG. 2 is a block diagram that illustrates an example configuration of computing device 2, in accordance with one or more aspects of this disclosure. For purposes of illustration, the discussion of FIG. 2 and the following figures includes continued references to FIG. 1. However, the techniques of this disclosure are not so limited. FIG. 2 illustrates only one particular example of computing device 2, and many other example configurations of computing device 2 exist.

As shown in the example of FIG. 2, computing device 2 includes one or more processors 30, one or more input devices 32, one or more communication units 34, one or more output devices 36, one or more storage devices 38, one or more communication channels 40, and UI device 4. Computing device 2 may include many other components. For example, computing device 2 may include physical buttons, microphones, speakers, communication ports, and so on.

Communication channel(s) 40 may interconnect each of the components 30, 32, 34, 36, 38, and 4 for inter-component communications (physically, communicatively, and/or operatively). In some examples, communication channel(s)

40 may include a system bus, a network connection, an interprocess communication data structure, or any other method for communicating data.

One or more storage device(s) 38 within computing device 2 may store information required for use during operation of computing device 2. Storage device(s) 38, in some examples, have the primary purpose of being a short term and not a long-term computer-readable storage medium. Storage device(s) 38 may be volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 38 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories. In some examples, processor(s) 30 on computing device 2 read and may execute instructions stored by storage device(s) 38.

Computing device 2 may include one or more input device(s) 32 that computing device 2 uses to receive user input. Examples of user input include tactile, audio, and video user input. Input device(s) 32 may include presence-sensitive screens, touch-sensitive screens, mice, keyboards, voice responsive systems, video cameras, microphones or other types of devices for detecting input from a human or machine.

Communication unit(s) 34 may enable computing device 2 to send data on and receive data from a communications network, such as a local area network or the Internet. In some examples, communication unit(s) 34 may include wireless transmitters and receivers that enable computing device 2 to communicate wirelessly with the communications network.

Output device(s) 36 may generate output. Examples of output include tactile, audio, and video output. Output device(s) 36 may include presence-sensitive screens, sound cards, video graphics adapter cards, speakers, cathode ray tube (CRT) monitors, liquid crystal displays (LCD), or other types of devices for generating output.

Processor(s) 30 may read instructions from storage device(s) 38 and may execute instructions stored by storage device(s) 38. Execution of the instructions by processor(s) 30 may configure or cause computing device 2 to provide at least some of the functionality ascribed in this disclosure to computing device 2. As shown in the example of FIG. 2, storage device(s) 38 include computer-readable instructions associated with operating system 44 and application modules 12A-12N. Furthermore, storage device(s) 38 may store computer-readable instructions associated with user management module 10, binaries 50A-50N (collectively, "binaries 50"), user data sets 52A-52N (collectively, "user data sets 52"), a profile database 54, computer-readable instructions associated with a marketplace module 56, computer-readable instructions associated with a launcher module 58, and computer-readable instructions associated with a media player module 60.

Execution of instructions associated with operating system 44 may cause computing device 2 to perform various functions to manage hardware resources of computing device 2 and to provide various common services for other computer programs. Execution of instructions associated with application modules 12 may cause computing device 2 to provide various applications (e.g., "apps").

Operating system 44 may receive indications of user input from input device(s) 32 and/or UI device 4. In response to receiving indications of user input, operating system 44 may provide further indications of user input (e.g., input events) to particular modules, such as user management module 10, application modules 12, marketplace module 56, launcher module 58, media player module 60, and so on. The input events may describe the user inputs received by computing device.

User management module 10 may cause computing device 2 to output, for display at UI device 4 and/or output device(s) 36, a profile-switching GUI. In some examples, the profile-switching GUI may be a lock screen of computing device 2. The profile-switching GUI may include graphical elements that correspond to user profiles of computing device 2. In response to receiving an indication of a user input that corresponds to a selection of one of the graphical elements of the profile-switching GUI and, in some instances, a correct response to a challenge, user management module 10 may switch a currently-active user profile to a user profile that corresponds to the selected graphical element of the profile-switching GUI.

Execution of marketplace module 56 may cause computing device 2 to output, for display at UI device 4 and/or output device(s) 36, a marketplace GUI. The marketplace GUI may include graphical elements that correspond to binaries available to be installed on computing device 2. For example, the binaries may correspond to applications. In other examples, the binaries may correspond to recorded songs, recorded videos (e.g., television programs, movies, etc.), electronic magazines, electronic books, and other types of electronic media resources. In some instances, payment is required to install particular ones of the binaries at computing device 2. Other ones of the binaries may be installed at computing device 2 for free.

In response to receiving an input event that corresponds to a selection of one of the graphical elements in the marketplace GUI, marketplace module 56 may determine, based at least in part on data in profile database 54, whether a binary associated with the selected graphical element is currently stored at computing device 2. For ease of explanation, this disclosure may refer to the binary associated with the selected graphical element as the "relevant binary."

In response to determining that the relevant binary is not stored at computing device 2, marketplace module 56 may cause computing device 2 to request the relevant binary from a computing system (e.g., remote computing system 20 of FIG. 1) other than computing device 2 and may receive the relevant binary from the computing system. In other words, marketplace module 56 may download the relevant binary from the computing system. In some examples, marketplace module 56 may download the relevant binary from an online marketplace provided by the remote computing system. In addition, marketplace module 56 may cause storage device(s) 38 to store the relevant binary.

Furthermore, in some examples, marketplace module 56 may cause computing device 2 to install the relevant binary. In some examples, the relevant binary may comprise instructions for causing computing device 2 to provide an application. In other words, the relevant binary may correspond to an application. In such examples, installing the relevant binary may include executing instructions in the relevant binary to configure computing device 2 to be able to provide the application. In other examples, computing device 2 may use the relevant binary to present a media resource. In other words, the relevant binary may correspond to a media resource. In some examples where the relevant binary corresponds to a media resource, installing the relevant binary may involve configuring a media library to include the media resource.

Regardless of whether the relevant binary is already associated with another user profile of computing device 2, marketplace module 56 may associate the relevant binary with the currently-active user profile. In various examples, marketplace module 56 may associate the relevant binary with the currently-active user profile in various ways. For instance, in the example of FIG. 2, profile database 54 may include data that indicate which user profiles are associated with binaries 50. Thus, in the example of FIG. 2, marketplace module 56 may modify profile database 54 such that profile database 54 indicates that the relevant binary is associated with the currently-active user profile.

Launcher module 58 may output, for display at UI device 4 and/or output device(s) 36, launcher GUIs for user profiles of computing device 2. The launcher GUI for a user profile may include a plurality of graphical elements that correspond to applications associated with the user profile. The graphical elements may include icons, information widgets, and so on. In response to indications of user inputs that correspond to selections of graphical elements in the launcher GUI, launcher module 58 may cause computing device 2 to initiate execution of (i.e., launch) ones of application modules 12 that correspond to the selected graphical elements.

As indicated above, a binary may include instructions that cause computing device 2 to provide an application. Prior to marketplace module 56 associating a binary with a user profile, the graphical elements of the launcher GUI for the user profile may not include a graphical element that corresponds to the application. However, after marketplace module 56 associates the binary with the user profile, the graphical elements of the launcher GUI for the user profile may include the graphical element that corresponds to the application.

After marketplace module 56 associates the relevant binary with a user profile, user management module 10 may switch the currently-active user profile from being a first user profile to being a second user profile. The first user profile may be associated with a particular binary that corresponds to a particular application, but the second user profile may not be associated with the particular binary. Accordingly, launcher module 58 may cause computing device 2 to output, for display at UI device 4 and/or output device(s) 36 and while the second user profile is the currently-active user profile, a launcher GUI for the second user profile. The launcher GUI for the second user profile may include a plurality of graphical elements that correspond to applications whose corresponding binaries are associated with the second user profile. Because the first and second user profiles may be associated with different binaries, the plurality of graphical elements in the launcher GUIs for the first and second user profiles may be different. Furthermore, because the second user profile is not associated with the particular binary, the launcher GUI for the second user profile may not include a graphical element that corresponds to the particular application.

Application modules 12 may generate user data sets 52. User data sets 52 may be segregated by user profile. Thus, an application module associated with multiple user profiles may generate separate user data sets for different ones of the user profiles associated with the application. In some examples, the application only accesses the user data set associated with the currently-active user profile.

For example, the application may be a word processor application and the user data set for a particular user profile may include a set of word processor documents. In this example, the application may generate, modify, or delete word processor documents in the user data set for the particular user profile when the particular user profile is the currently-active user profile. Furthermore, in this example, the word processor application may only display word processor documents that are in the user data set for the particular user profile when the particular user profile is the currently-active user profile. In this way, the word processor application does not enable a user to see word processor documents associated with user profiles that are not the currently-active user profile. In another example, user data sets 52 may include interpersonal messages for different users.

As indicated above, binaries 50 may correspond to media resources. If a particular user profile is the currently-active user profile, media player module 60 may cause computing device 2 to present media resources associated with the particular user profile. Presenting an audio resource or a video resource may involve playing back the audio or video resource. Presenting an electronic magazine or book may involve outputting, for display at UI device 4 and/or output device 36, pages of the electronic magazine or book. Because multiple user profiles of computing device 2 may be associated with the same binary, computing device 2 may use a same copy of the binary to present a media resource, regardless of which of the user profiles associated with the binary is the currently-active user profile.

Although FIG. 2 and FIG. 4, described below, are described with reference to a marketplace for binaries, the techniques of this disclosure may be applicable in situations that do not involve a formal online marketplace for binaries. For example, computing device 2 may, in response to receiving a user input that corresponds to a user selection of a link to a binary, determine whether computing device 2 already stores the binary, selectively download the binary, and associate the binary with the currently-active user profile. Furthermore, in some examples, computing device 2 may, without first receiving an indication of user input, determine whether computing device 2 already stores a binary, selectively download the binary, and associate the binary with the currently-active user profile. For example, computing device 2 may, as part of executing a program, determine whether computing device 2 already stores a binary, selectively download the binary, and associate the binary with the currently-active user profile.

Figure 3:
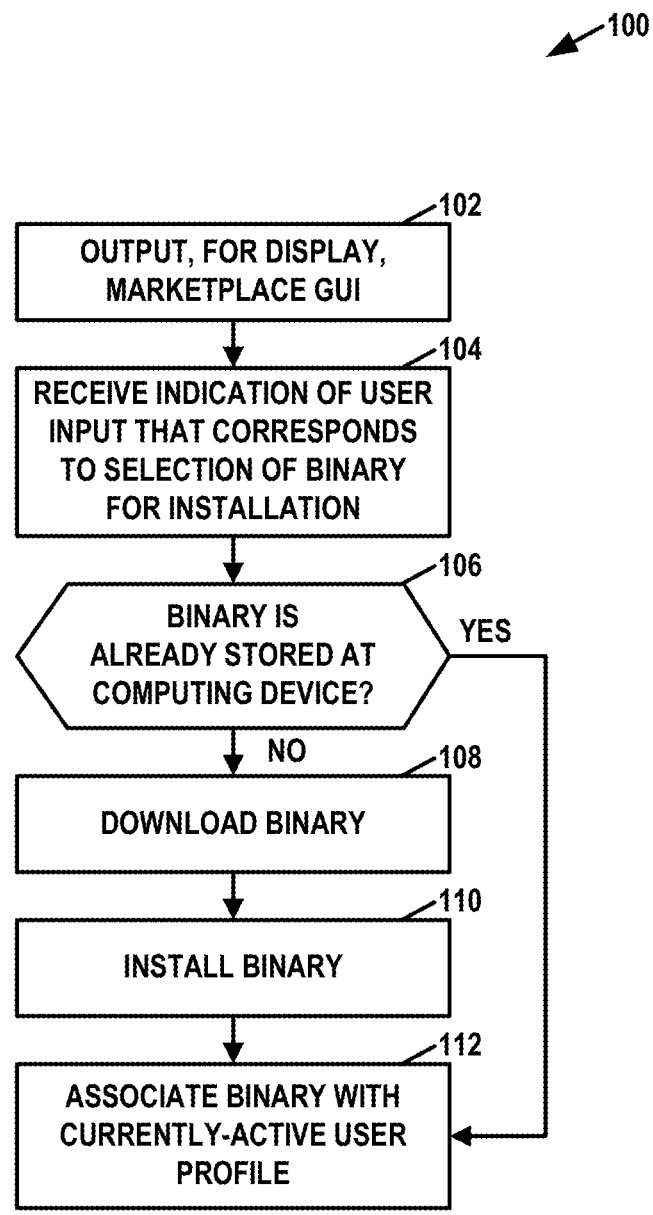
FIG. 3 is a flowchart illustrating an example operation of the computing device for acquiring a binary, in accordance with one or more aspects of this disclosure.

FIG. 3 is a flowchart illustrating an example operation 100 of computing device 2 for acquiring a binary, in accordance with one or more aspects of this disclosure. FIG. 3 is described with continuing reference to FIG. 2. However, the operation of FIG. 3 is not so limited.

In the example of FIG. 3, marketplace module 56 may cause computing device 2 to output, for display at UI device 4 and/or output devices 36, a marketplace GUI (102). The marketplace GUI may include graphical elements that correspond to binaries that are available to be installed at computing device 2. For example, the marketplace GUI may include images, such as album cover art or artist pictures, that correspond to recorded music that is available to be installed at computing device 2.

Furthermore, in the example of FIG. 3, marketplace module 56 may receive an indication of a user input that corresponds to a user selection of a particular binary for installation at computing device 2 (104). For example, the user input may correspond to a selection of a graphical element in the marketplace GUI that corresponds to the particular binary.

In response to receiving the indication of the user input, marketplace module 56 may determine whether the particular binary is already stored at computing device 2 (106). In response to determining that the particular binary is not already stored at computing device 2 ("NO" branch of 106), marketplace module 56 may download the particular binary from a computing system other than computing device 2 (e.g., remote computing system 20) (108). In addition, marketplace module 56 may install the particular binary at computing device 2 (110). In examples where the particular binary corresponds to an application, installing the particular binary may involve configuring computing device 2 to provide the application. In examples where the particular binary corresponds to a media resource, installing the particular binary may involve adding the media resource to a media library. Furthermore, marketplace module 56 may associate the particular binary with the currently-active user profile (112). For example, if a particular user profile is the currently-active user profile, marketplace module 56 may associate the particular binary with the currently-active user profile.

On the other hand, in response to determining that the particular binary is already stored at computing device 2 ("YES" branch of 106), marketplace module 56 may associate the particular binary with the currently-active user profile (112). Thus, if the particular binary is already stored at computing device 2, marketplace module 56 may not download or install the particular binary again.

Figure 4:
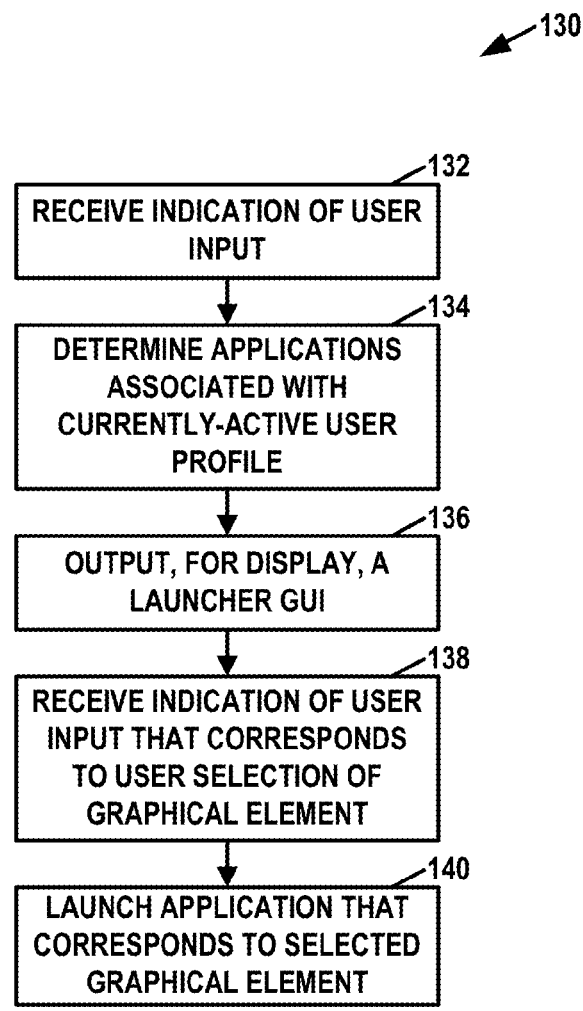
FIG. 4 is a flowchart illustrating an example operation of the computing device for launching an application, in accordance with one or more aspects of this disclosure.

FIG. 4 is a flowchart that illustrates an example operation 130 of computing device 2 for launching an application, in accordance with one or more aspects of this disclosure. FIG. 4 is described with continuing reference to FIG. 2. However, the operation of FIG. 4 is not so limited.

In the example of FIG. 4, launcher module 58 may receive an indication of a user input (132). In response to receiving the indication of the user input, launcher module 58 may determine which applications installed at computing device 2 are associated with the currently-active user profile (134). In some examples, launcher module 58 may determine, based on data in profile database 54, which applications installed at computing device 2 are associated with the currently-active user profile.

In addition, launcher module 58 may output, for display at UI device 4 and/or output device(s) 36, a launcher GUI (136). The launcher GUI may include graphical elements that correspond to at least some of the applications that are associated with the currently-active user profile. The launcher GUI does not, in typical examples, include graphical elements that correspond to applications that are installed at computing device 2 but are not associated with the currently-active user profile.

Subsequently, while the launcher GUI is displayed, launcher module 58 may receive an indication of a user input that corresponds to a user selection of a graphical element in the launcher GUI (138). In response to receiving the indication of the user input that corresponds to a user selection of the graphical element in the launcher GUI, launcher module 58 may launch an application that corresponds to the selected graphical element (140).

Figure 5:
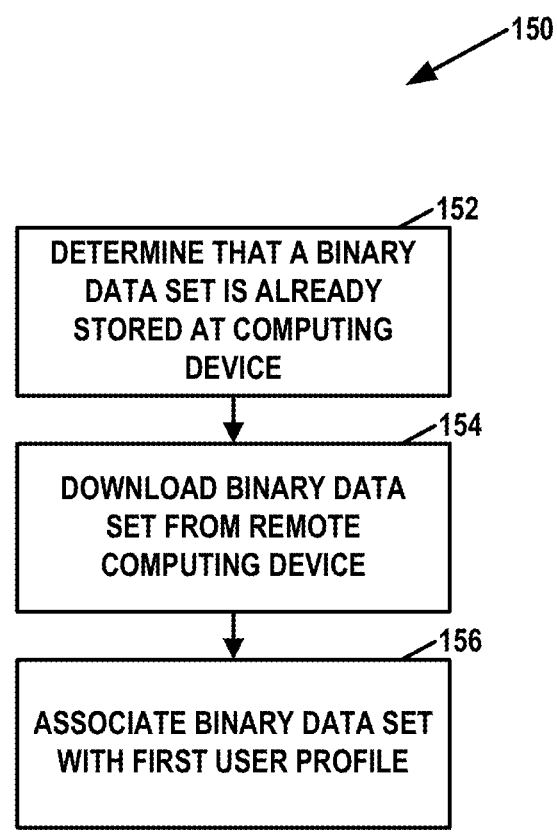
FIG. 5 is a flowchart illustrating an example operation of the computing device, in accordance with one or more aspects of this disclosure.

FIG. 5 is a flowchart that illustrates an example operation 150 of computing device 2, in accordance with one or more aspects of this disclosure. In the example of FIG. 5, computing device 2 may determine that a binary data set is already stored at computing device 2 (152). In the example of FIG. 5, the binary data set is not associated with a particular user profile of the computing device, the particular user profile being a currently-active user profile of the computing device. In response to determining that the binary data set is not already stored at computing device 2, computing device 2 may download the binary data set from a computing system other than computing device 2 (154). In addition, computing device 2 may associate the binary data set with the particular user profile (156).

Figure 6:
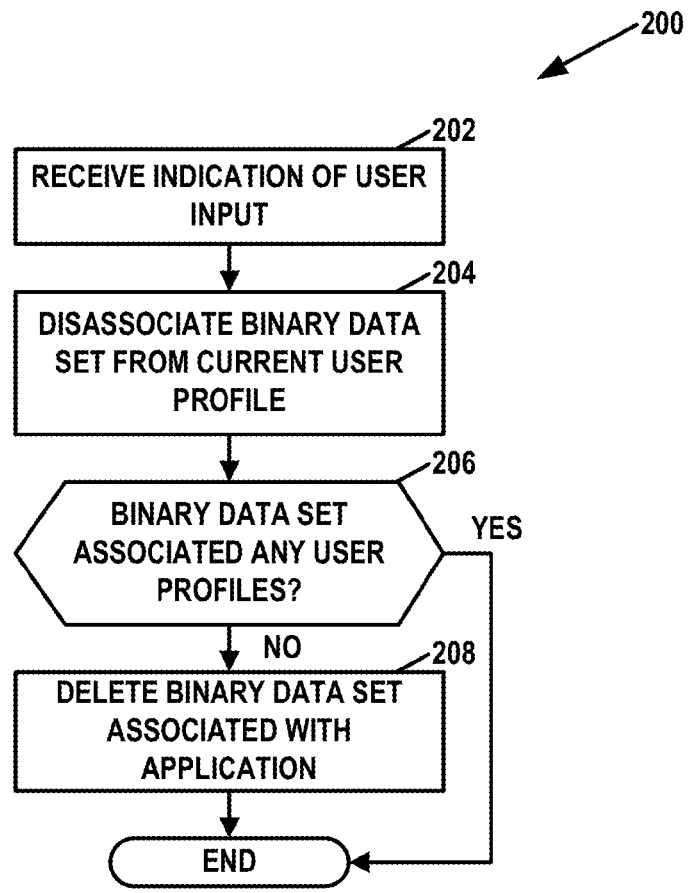
FIG. 6 is a flowchart illustrating an example operation of the computing device for deletion of a binary data set, in accordance with one or more aspects of this disclosure.

FIG. 6 is a flowchart illustrating an example operation 200 of computing device 2, in accordance with one or more aspects of this disclosure. In the example of FIG. 6, computing device 2 may receive an indication of a user input to uninstall an application from computing device 2 (202). In response to the indication of the user input, computing device 2 may disassociate a binary data set associated with the application from the currently active user profile (204). For example, computing device 2 may maintain data that indicate binary data sets that are associated with respective user profiles. In this example, computing device 2 may modify this data to no longer indicate that the application's binary data set is associated with the currently active user profile.

Furthermore, in response to the indication of the user input, computing device 2 may determine whether the application's binary data set is associated with any user profiles of computing device 2 (206). In response to determining that the application's binary data set is not associated with any user profiles of computing device 2 ("NO" of 206), computing device 2 may delete, from computing device 2, the application's binary data set (208). On the other hand, if the application's binary data set is still associated with one or more user profiles of computing device 2 ("YES" of 206), operation 200 may end without computing device 2 deleting the application's binary data set. In this way, the application's binary data set may remain stored at computing device 2 until no user profiles are associated with the application. Although the discussion of FIG. 6 describes the uninstallation of an application, FIG. 6 may be applicable to other types of resources, such as media resources, instead of applications.

Figure 7:
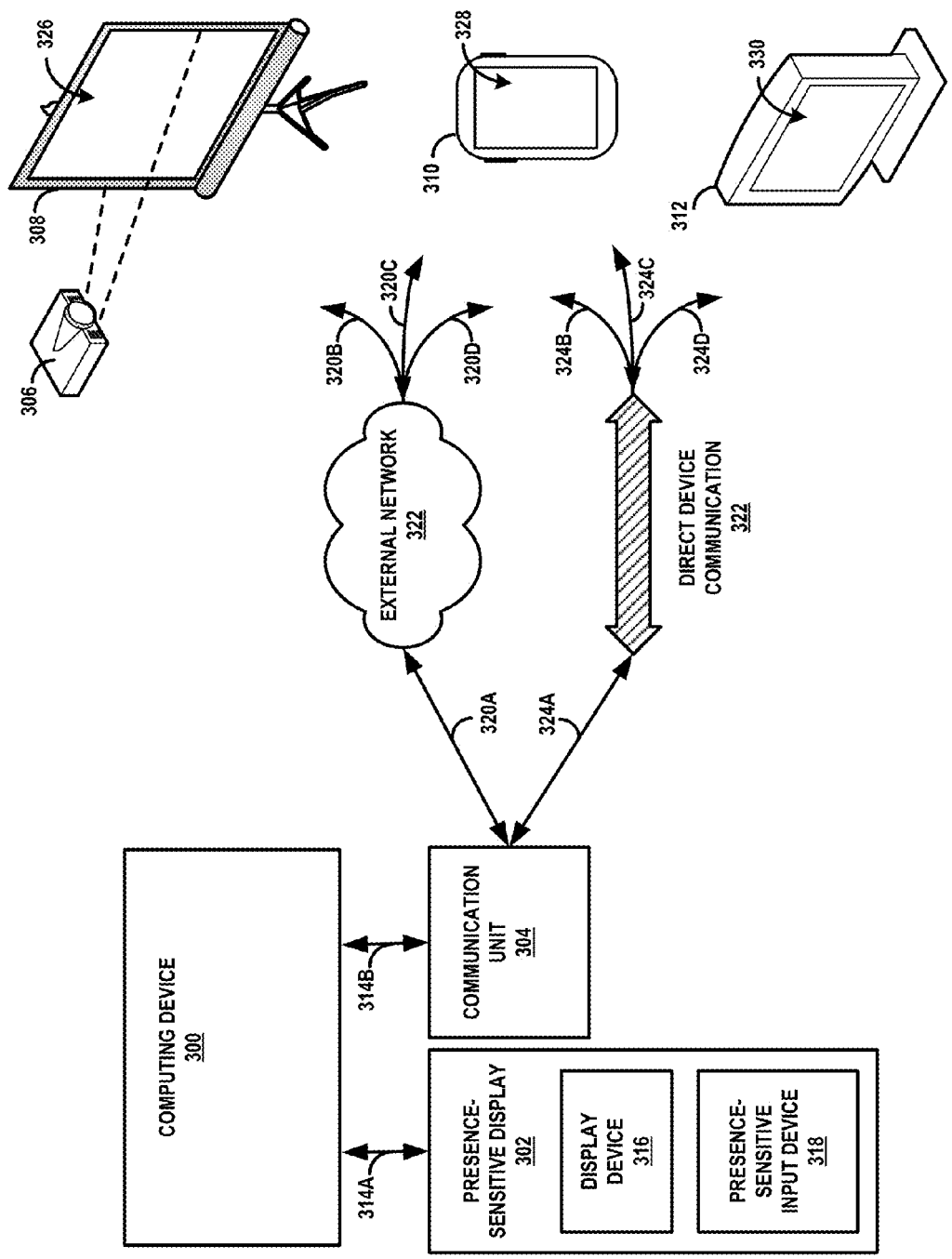
FIG. 7 is a block diagram illustrating an example computing device that outputs data for display at one or more remote devices, in accordance with one or more techniques of the present disclosure.

FIG. 7 is a block diagram illustrating an example computing device 300 that outputs data for display at one or more remote devices, in accordance with one or more techniques of the present disclosure. The one or more remote devices may display graphical content based on the data output by computing device 300. In general, graphical content may include any visual information that may be output for display, such as text, images, a group of moving images, etc. In some examples, computing device 300 may output data, such as Hypertext Markup Language (HTML) data, that a remote device may render to generate graphical content displayed by the remote device. In other examples, computing device 300 may output digital or analog signals that a remote device may use to generate graphical content displayed by the remote device.

In the example of FIG. 7, computing device 300 is operatively coupled to a presence-sensitive display 302 and a communication unit 304. Furthermore, in the example of FIG. 7, the one or more remote devices include a projector 306, a projection screen 308, a mobile device 310, and a visual display device 312. Computing device 300 may include and/or be operatively coupled to one or more other devices, e.g., input devices, output devices, memory, storage devices, etc. that are not shown in FIG. 3 for purposes of brevity and illustration.

Computing device 300 may be a processor that has the functionality described above with respect to processor(s) 30 (FIG. 2). For instance, computing device 300 may be a microprocessor, ASIC, or another type of integrated circuit configured to implement the techniques of this disclosure. In other examples, such as those illustrated in FIGS. 1 and 2, computing device 300 may be a stand-alone computing device that includes or is operatively coupled to a presence-sensitive display. In such examples, computing device 300 may be a desktop computer, a tablet computer, a smart television platform, a camera, a personal digital assistant (PDA), a server device, a mainframe computer, a telephone, a portable gaming device, a personal media player, a remote control device, a wearable computing device, or another type of computing device. In this disclosure, a first device may be said to be operatively coupled to a second device if the operations of the first and second devices are coupled in some way.

Computing device 300 may communicate with presence-sensitive display 102 via a communication channel 314A. Computing device 300 may communicate with communication unit 304 via a communication channel 314B. Communication channels 302A, 302B may each include a system bus or another suitable connection. Although the example of FIG. 7 shows computing device 300, presence-sensitive display 302, and communication unit 304 as being separate, computing device 300, presence-sensitive display 302, and/or communication unit 304 may be integrated into a single device.

In the example of FIG. 7, presence-sensitive display 302 includes a display device 316 and a presence-sensitive input device 318. Display device 316 may display graphical content based on data received from computing device 300. Presence-sensitive input device 318 may determine one or more user inputs (e.g., continuous gestures, multi-touch gestures, single-touch gestures, etc.). Presence-sensitive input device 318 may use capacitive, inductive, and/or optical recognition techniques to determine the user inputs. Presence-sensitive display 302 may send indications of such user inputs to computing device 300 via communication channel 314A or another communication channel. In some examples, presence-sensitive input device 318 is physically positioned relative to display device 316 such that presence-sensitive input device 318 is able to detect the presence of an input object (e.g., a finger or a stylus) at a location on display device 316 that displays a graphical element when a user positions the input object at the location on display device 316 that displays the graphical element Communication unit 304 may have the functionality of communication unit(s) 34. This disclosure describes the functionality of communication unit(s) 34 with regard to FIG. 2. Examples of communication unit 304 may include network interface cards, Ethernet cards, optical transceivers, radio frequency transceivers, Bluetooth, 3G, and WiFi radios, Universal Serial Bus (USB) interfaces, or other types of devices that are able to send and receive data. When computing device 300 outputs data for display at the one or more remote devices (such as projector 306, projection screen 308, mobile device 310, and visual display device 312), computing device 300 may output the data to a communication unit of computing device 300, such as communication unit 304. Communication unit 304 may send the data to one or more of the remote devices. The one or more remote devices may display graphical content based at least in part on the data.

Communication unit 304 may send and receive data using various communication techniques. In the example of FIG. 7, a network link 320A operatively couples communication unit 304 to an external network 322. Network links 320B, 320C, and 320D may operatively couple each of the remote devices to external network 322. External network 322 may include network hubs, network switches, network routers, or other types of devices that exchange information between computing device 300 and the remote devices illustrated in FIG. 7. In some examples, network links 320A-320D may be Ethernet, ATM or other wired and/or wireless network connections.

In some examples, communication unit 304 may use direct device communication 322 to communicate with one or more of the remote devices included in FIG. 7. Direct device communication 322 may include communications through which computing device 300 sends and receives data directly with a remote device, using wired or wireless communication. That is, in some examples of direct device communication 322, data sent by computing device 300 may not be forwarded by one or more additional devices before being received at the remote device, and vice-versa. Examples of direct device communication 322 may include Bluetooth, Near-Field Communication, Universal Serial Bus, WiFi, infrared, etc. One or more of the remote devices illustrated in FIG. 7 may be operatively coupled with communication unit 304 by communication links 324A-324D. In some examples, communication links 324A-324D may be connections using Bluetooth, Near-Field Communication, Universal Serial Bus, infrared, etc. Such connections may be wireless and/or wired connections.

In the example of FIG. 7, projector 306 receives data from computing device 300. Projector 306 may project graphical content based on the data onto projection screen 308. The example of FIG. 7 shows projector 306 as a tabletop projector and shows projection screen 308 as a freestanding screen. In other examples, computing device 300 may output data for display at other types of projection devices, such as electronic whiteboards, holographic display devices, and other suitable devices for displaying graphical content.

In some examples, projector 306 may determine one or more user inputs (e.g., continuous gestures, multi-touch gestures, single-touch gestures, etc.) at projection screen 308 and send indications of such user input to computing device 300. In such examples, projector 306 may use optical recognition or other suitable techniques to determine the user input. Projection screen 308 (e.g., an electronic whiteboard) may display graphical content based on data received from computing device 300.

Mobile device 310 and visual display device 312 may each have computing and connectivity capabilities and may each receive data that computing device 300 output for display. Examples of mobile device 310 may include e-reader devices, convertible notebook devices, hybrid slate devices, etc. Examples of visual display device 312 may include televisions, computer monitors, etc. As shown in FIG. 7, projection screen 308 may include a presence-sensitive display 326, mobile device 310 may include a presence-sensitive display 328, and visual display device 312 may include a presence-sensitive display 330. Presence-sensitive displays 326, 328, 330 may have some or all of the functionality described in this disclosure for UI device 4. In some examples, presence-sensitive displays 326, 328, 330 may include functionality in addition to the functionality of UI device 4. Presence-sensitive displays 326, 328, 330 may receive data from computing device 300 and may display graphical content based on the data. In some examples, presence-sensitive displays 326, 328, 330 may determine one or more user inputs (e.g., continuous gestures, multi-touch gestures, single-touch gestures, etc.) and send indications of such user input to computing device 300. Presence-sensitive displays 326, 328, and/or 330 may use capacitive, inductive, optical recognition techniques and/or other techniques to determine the user input.

In some examples, computing device 300 does not output data for display at presence-sensitive display 302. In other examples, computing device 300 may output data for display such that both presence-sensitive display 302 and the one or more remote devices display the same graphical content. In such examples, each respective device may display the same graphical content substantially contemporaneously. In such examples, the respective devices may display the graphical content at different times due to communication latency. In other examples, computing device 300 may output data for display such that presence-sensitive display 302 and the one or more remote devices display different graphical content.

In the example of FIG. 7, computing device 300 may determine whether a binary data set is already stored at the computing device, where the binary data set is not associated with a particular user profile of the computing device and the particular user profile being a currently-active user profile of the computing device. Furthermore, in response to determining that the binary data set is not already stored at computing device 300, computing device 300 may download the binary data set from a remote computing system and associate the binary data set with the particular user profile. Furthermore, computing device 300 may associate, in response to determining that the binary data set is already stored at the computing device, the binary data set with the first user profile without downloading the binary data set.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   while a particular user profile is a currently-active profile of a computing device that is configured with a plurality of user profiles:
      determining, by the computing device, whether a binary data set that is associated with an application and that is not associated with the particular user profile is already stored at the computing device;
      responsive to determining that the binary data set is not already stored at the computing device:
         downloading, by the computing device, the binary data set from a computing system other than the computing device; and
         associating, by the computing device, the binary data set with the particular user profile;
      responsive to determining that the binary data set is already stored at the computing device, associating the binary data set with the particular user profile without downloading the binary data set; and
      responsive to receiving an indication of user input to uninstall the application:
         disassociating, by the computing device, the binary data set from the particular user profile;
         determining, by the computing device, whether the binary data set is associated with any of the plurality of user profiles; and
         responsive to determining that the binary data set is not associated with any of the plurality of user profiles, automatically deleting, by the computing device, from the computing device, the binary data set.

2. The method of claim 1, wherein the indication of the user input is an indication of a first user input, the method further comprising:
   receiving, by the computing device, an indication of a second user input,
   wherein determining whether the binary data set is already stored at the computing device is in response to receiving the indication of the second user input.

3. The method of claim 1, wherein the particular user profile is a first user profile and prior to associating the binary data set with the particular user profile, the binary data set is already associated with a second user profile in the plurality of user profiles.

4. The method of claim 1, wherein downloading the binary data set from the computing system comprises downloading, by the computing device, the binary data set from an online marketplace provided by the computing system.

5. The method of claim 1, wherein associating the binary data set with the particular user profile comprises modifying, by the computing device, a database such that the database indicates that the binary data set is associated with the particular user profile.

6. The method of claim 1, further comprising executing, by the computing device, instructions in the binary data set, wherein execution of the instructions in the binary data set configures the computing device to provide the application.

7. The method of claim 6, further comprising responsive to determining that the binary data set is not already stored at the computing device:
   storing, by the computing device, the binary data set; and
   configuring, by the computing device, the application for use at the computing device.

8. The method of claim 6, further comprising outputting, by the computing device, for display, and while the particular user profile is the currently-active user profile, a user interface that includes a plurality of graphical elements that correspond to applications associated with the particular user profile,
   wherein prior to associating the binary data set with the particular user profile, the plurality of graphical elements did not include a graphical element that corresponds to the application and after associating the binary data set with the particular user profile, the plurality of graphical elements include the graphical element that corresponds to the application.

9. The method of claim 8, wherein the user interface is a first user interface, the plurality of graphical elements is a first plurality of graphical elements, and the method further comprises:
   switching, by the computing device, the currently-active user profile from being the particular user profile to being a second user profile, the second user profile not being associated with the binary data set; and
   outputting, by the computing device, for display, and while the second user profile is the currently-active user profile, a second user interface, the second user interface including a second plurality of graphical elements that correspond to applications whose binaries are associated with the second user profile, the second plurality of graphical elements not including the graphical element that corresponds to the application.

10. The method of claim 6, wherein the computing device executes a same copy of the binary data set to provide the application, regardless of which user profile of the computing device is the currently-active user profile.

11. The method of claim 10, further comprising generating, by the computing device and for each user profile of the computing device associated with the binary data set, separate user data sets associated with the application.

12. The method of claim 11, wherein at least one user data set of the separate user data sets associated with the application comprises inter-personal messages.

13. The method of claim 7, wherein:
   the method further comprises:
      outputting, by the computing device and for display, a user interface comprising a plurality of graphical elements that correspond to applications available for installation on the computing device; and
      receiving, by the computing device, an indication of a user selection of a graphical element from the plurality of graphical elements that corresponds to the application; and
   determining whether the binary data set is already stored at the computing device comprises responsive to receiving the indication of the user selection of the graphical element, determining, by the computing device, whether the binary data set is already stored at the computing device.

14. The method of claim 1, further comprising, using, by the computing device, the binary data set to present a media resource.

15. The method of claim 14, wherein the media resource comprises a recorded song, a recorded video, an electronic magazine, or an electronic book.

16. The method of claim 14, wherein the computing device uses a same copy of the binary data set to present the media resource, regardless of which user profile of the device is the currently-active user profile.

17. A computing device that is configured with a plurality of user profiles, the computing device comprising one or more processors configured such that, while a particular user profile is a currently-active profile of the computing device, the one or more processors:
   determine whether a binary data set that is associated with an application and that is not associated with the particular user profile is already stored at the computing device,
   responsive to determining that the binary data set is not already stored at the computing device:
      download the binary data set from a computing system other than the computing device; and
      associate the binary data set with the particular user profile;
   responsive to determining that the binary data set is already stored at the computing device, associate the binary data set with the particular user profile without downloading the binary data set; and
   responsive to receiving an indication of user input to uninstall the application:
      disassociate the binary data set from the particular user profile;
      determine whether the binary data set is associated with any of the plurality of user profiles; and
      responsive to determining that the binary data set is not associated with any of the plurality of user profiles, automatically delete, from the computing device, the binary data set.

18. The computing device of claim 17, wherein the one or more processors are further configured to execute instructions in the binary data set, wherein execution of the instructions in the binary data set causes the computing device to provide the application.

19. The computing device of claim 18,
   wherein the one or more processors are further configured to output, for display, and while the particular user profile is the currently-active user profile of the computing device, a user interface that includes a plurality of graphical elements that correspond to applications associated with the particular user profile, and
   wherein prior to associating the binary data set with the particular user profile, the plurality of graphical elements did not include a graphical element that corresponds to the application and after associating the binary data set with the particular user profile, the plurality of graphical elements include the graphical element that corresponds to the application.

20. A computer-readable storage medium that stores instructions that, when executed by one or more processors of a computing device that is configured with a plurality of user profiles, cause the computing device to:
   while a particular user profile is a currently-active profile of a computing device that is configured with a plurality of user profiles:

responsive to receiving an indication of a user input, determine whether a binary data set that is associated with an application and that is not associated with the particular user profile is already stored at the computing device, responsive to determining that the binary data set is not already stored at the computing device:
  download the binary data set from a computing system other than the computing device; and
  associate the binary data set with the particular user profile;

responsive to determining that the binary data set is already stored at the computing device, associate the binary data set with the particular user profile without downloading the binary data set; and responsive to receiving an indication of user input to uninstall the application:
  disassociate the binary data set from the particular user profile;
  determine whether the binary data set is associated with any of the plurality of user profiles; and
  responsive determining that the binary data set is not associated with any of the plurality of user profiles, automatically delete, from the computing device, the binary data set.

* * * * *